(12) United States Patent
Pezeshki et al.

(10) Patent No.: US 11,502,915 B2
(45) Date of Patent: Nov. 15, 2022

(54) TRANSMISSION OF KNOWN DATA FOR COOPERATIVE TRAINING OF ARTIFICIAL NEURAL NETWORKS

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/019,125

(22) Filed: Sep. 11, 2020

(65) Prior Publication Data

US 2022/0086057 A1    Mar. 17, 2022

(51) Int. Cl.
| | | |
|---|---|---|
| *H04L 41/16* | (2022.01) | |
| *G06K 9/62* | (2022.01) | |
| *G06N 3/08* | (2006.01) | |
| *H04B 7/06* | (2006.01) | |
| *H04W 64/00* | (2009.01) | |
| *H04W 72/04* | (2009.01) | |
| *H04W 72/06* | (2009.01) | |
| *H04W 84/18* | (2009.01) | |

(52) U.S. Cl.
CPC ............ *H04L 41/16* (2013.01); *G06K 9/6256* (2013.01); *G06N 3/08* (2013.01); *H04B 7/0617* (2013.01); *H04W 64/003* (2013.01); *H04W 64/006* (2013.01); *H04W 72/042* (2013.01); *H04W 72/0413* (2013.01); *H04W 72/06* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2019/0342768 A1 | 11/2019 | Xu et al. | |
| 2020/0304378 A1* | 9/2020 | Choi | .................... H04L 41/145 |
| 2021/0160149 A1* | 5/2021 | Ma | ...................... H04L 41/0816 |
| 2021/0166105 A1* | 6/2021 | Panjwani | .............. G06N 3/0481 |
| 2021/0219099 A1* | 7/2021 | Koteshwar | ............ H04W 4/029 |

(Continued)

FOREIGN PATENT DOCUMENTS

WO    2019119442 A1    6/2019

OTHER PUBLICATIONS

International Search Report and Written Opinion—PCT/US2021/046169—ISA/EPO—dated Nov. 22, 2021.

*Primary Examiner* — Gregory B Sefcheck
*Assistant Examiner* — Amarnauth G Persaud
(74) *Attorney, Agent, or Firm* — Seyfarth Shaw LLP

(57) ABSTRACT

A method of wireless communications performed by a receiving device includes transmitting, to a first transmitting device of a set of transmitting devices, a request for a first known payload for training an artificial neural network of the receiving device. The set of transmitting devices may be a multi-transmit and receive point (TRP) group or a set of user equipment (UEs). The first transmitting device may be a serving TRP or one UE of the set of UEs. The method also includes receiving, from the first transmitting device, the first known payload in response to the request. The method further includes updating, at the receiving device, the artificial neural network based on at least the first known payload.

103 Claims, 12 Drawing Sheets

(56) References Cited

U.S. PATENT DOCUMENTS

2021/0297928 A1* 9/2021 Chowta .................. H04L 45/08
2021/0306192 A1* 9/2021 Ge ........................... G06N 3/08
2021/0326700 A1* 10/2021 Brown .................. G06N 3/126
2021/0342687 A1* 11/2021 Wang .................. G06N 3/0445
2022/0067500 A1* 3/2022 Choque ............. G06Q 30/0282

* cited by examiner

TRANSMISSION OF KNOWN DATA FOR COOPERATIVE TRAINING OF ARTIFICIAL NEURAL NETWORKS

FIELD OF THE DISCLOSURE

Aspects of the present disclosure generally relate to wireless communications, and more particularly to techniques and apparatuses for transmitting a known payload for cooperative training of artificial neural networks.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit and receive point (TRP), a New Radio (NR) BS, a fifth generation (5G) Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunications standards that employ these technologies.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communication performed by a receiving device transmits, to a first transmitting device of a set of transmitting devices, a request for a first known payload for training an artificial neural network of the receiving device. The method also receives, from the first transmitting device, the first known payload in response to the request. The method further updates, at the receiving device, the artificial neural network based on at least the first known payload.

In another aspect of the present disclosure, a method of wireless communication performed by at least a first transmitting device of a set of transmitting devices transmits, to a receiving device of a set of receiving devices, a first unknown payload based on first transmission settings of the first transmitting device. The method also receives, from the receiving device, a request for a first known payload for training an artificial neural network of the receiving device. The method further transmits, to the receiving device, the first known payload based on the first transmission settings.

In another aspect of the present disclosure, an apparatus for wireless communications performed by a receiving device, includes a processor and memory coupled with the processor. Instructions stored in the memory are operable, when executed by the processor, to cause the apparatus to transmit, to a first transmitting device of a set of transmitting devices, a request for a first known payload for training an artificial neural network of the receiving device. The apparatus can also receive, from the first transmitting device, the first known payload in response to the request. The apparatus can further update, at the receiving device, the artificial neural network based on at least the first known payload.

In another aspect of the present disclosure, an apparatus for wireless communications performed by at least a first transmitting device of a set of transmitting devices, includes a processor and memory coupled with the processor. Instructions stored in the memory are operable, when executed by the processor, to cause the apparatus to transmit, to a receiving device of a set of receiving devices, a first unknown payload based on first transmission settings of the first transmitting device. The apparatus can also receive, from the receiving device, a request for a first known payload for training an artificial neural network of the receiving device. The apparatus can further transmit, to the receiving device, the first known payload based on the first transmission settings.

In another aspect of the present disclosure, a receiving device includes means for transmitting, to a first transmitting device of a set of transmitting devices, a request for a first known payload for training an artificial neural network of the receiving device. The receiving device also includes means for receiving, from the first transmitting device, the first known payload in response to the request. The receiving device further includes means for updating, at the receiving device, the artificial neural network based on at least the first known payload.

In another aspect of the present disclosure, a transmitting device includes means for transmitting, to a receiving device of a set of receiving devices, a first unknown payload based on first transmission settings of the first transmitting device. The transmitting device also includes means for receiving, from the receiving device, a request for a first known payload for training an artificial neural network of the receiving device. The transmitting device further includes means for transmitting, to the receiving device, the first known payload based on the first transmission settings.

In another aspect of the present disclosure, a non-transitory computer-readable medium with program code recorded thereon is disclosed. The program code is executed by a receiving device and includes program code to transmit, to a first transmitting device of a set of transmitting devices, a request for a first known payload for training an artificial neural network of the receiving device. The receiving device also includes program code to receive, from the first transmitting device, the first known payload in response to the request. The receiving device further includes program code to update, at the receiving device, the artificial neural network based on at least the first known payload.

In another aspect of the present disclosure, a non-transitory computer-readable medium with program code recorded thereon is disclosed. The program code is executed by a transmitting device and includes program code to transmit, to a receiving device of a set of receiving devices, a first unknown payload based on first transmission settings of the first transmitting device. The transmitting device also includes program code to receive, from the receiving device, a request for a first known payload for training an artificial neural network of the receiving device. The transmitting device further includes program code to transmit, to the receiving device, the first known payload based on the first transmission settings.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Figure 1:
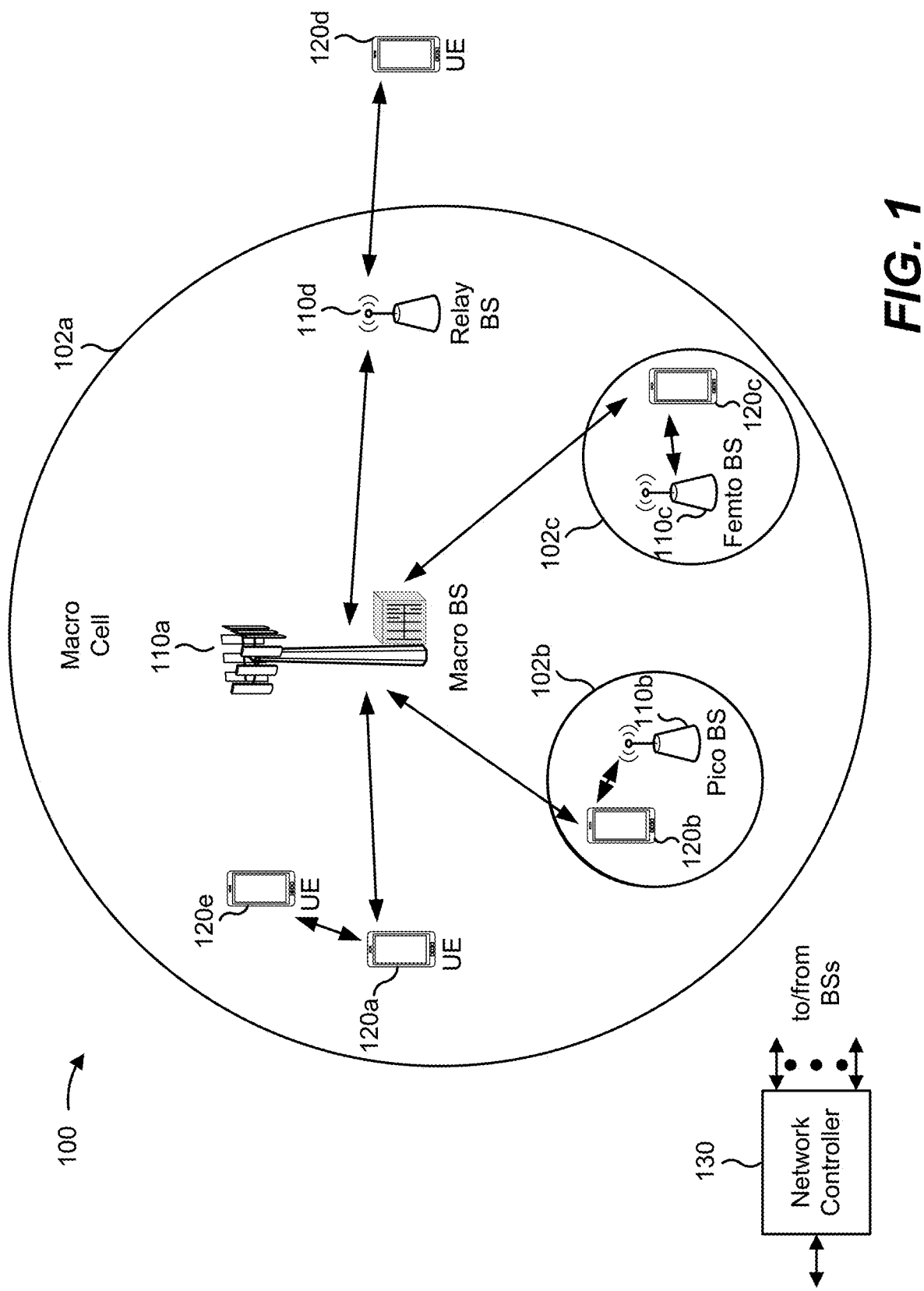
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
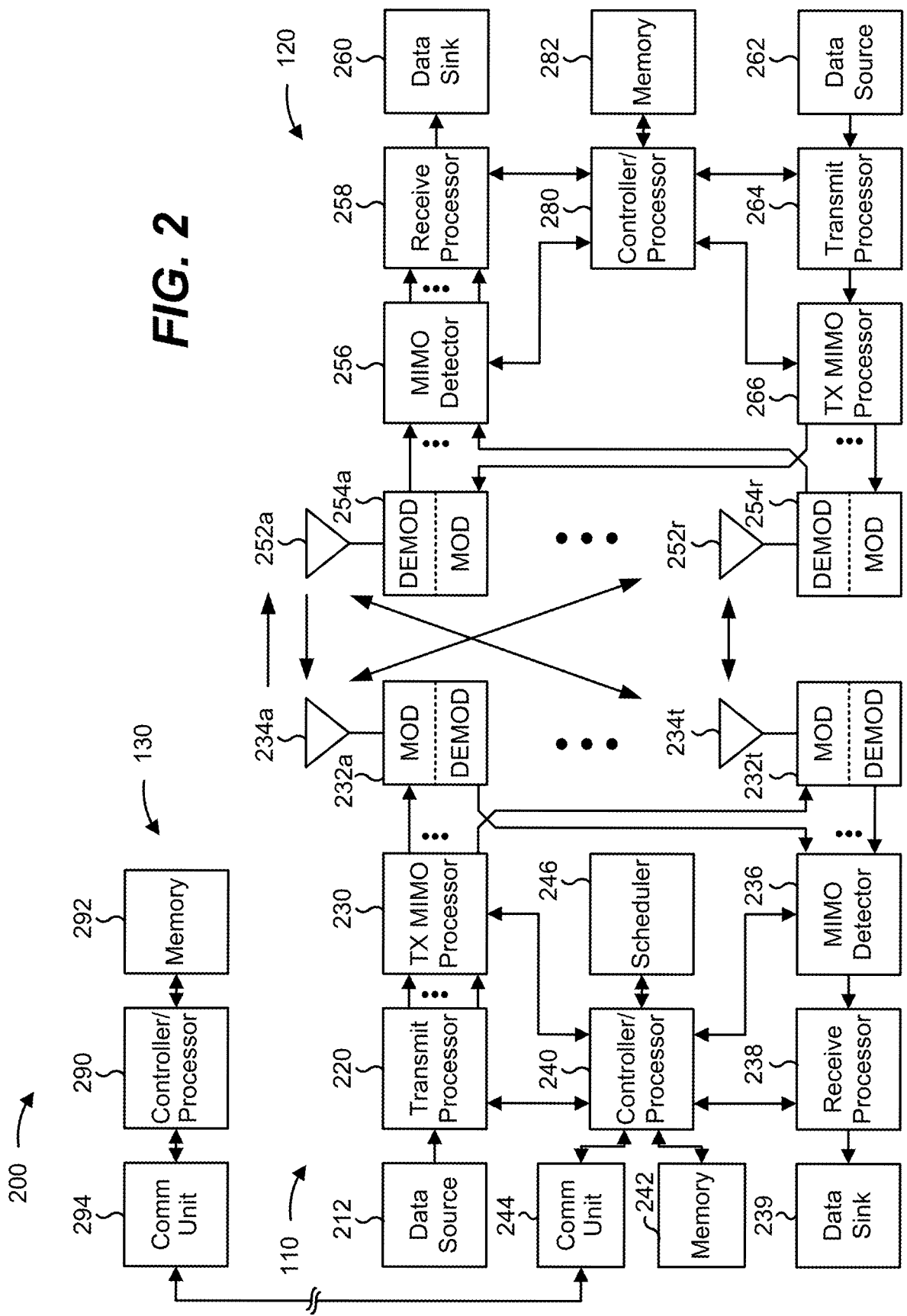
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 240 of base station 110, controller/processor 280 of UE 120, and/or any other component(s) of FIG. 2 may perform one or more techniques associated with transmitting or receiving known payloads for cooperative neural network training, as described below. For example, controller/processor 240 of base station 110, controller/processor 280 of UE 120, and/or any other component(s) of FIG. 2 may perform or direct operations of, for example, the processes 1000, 1100 of FIGS. 10 and 11, and/or other processes as described. Memories 242 and 282 may store data and program codes for base station 110 and UE 120, respectively. A scheduler 246 may schedule UEs for data transmission on the downlink and/or uplink.

In some aspects, the UE 120 or the base station 110 may include means for means for transmitting, to a first transmitting device of a set of transmitting devices, a request for a first known payload for training an artificial neural network of the receiving device; means for receiving, from the first transmitting device, the first known payload in response to the request; and means for updating, at the receiving device, the artificial neural network based on at least the first known payload.

In other aspects, the UE 120 or the base station 110 may include means for transmitting, to a receiving device of a set of receiving devices, a first unknown payload based on first transmission settings of the first transmitting device; means for receiving, from the receiving device, a request for a first known payload for training an artificial neural network of the receiving device; and means for transmitting, to the receiving device, the first known payload based on the first transmission settings.

Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
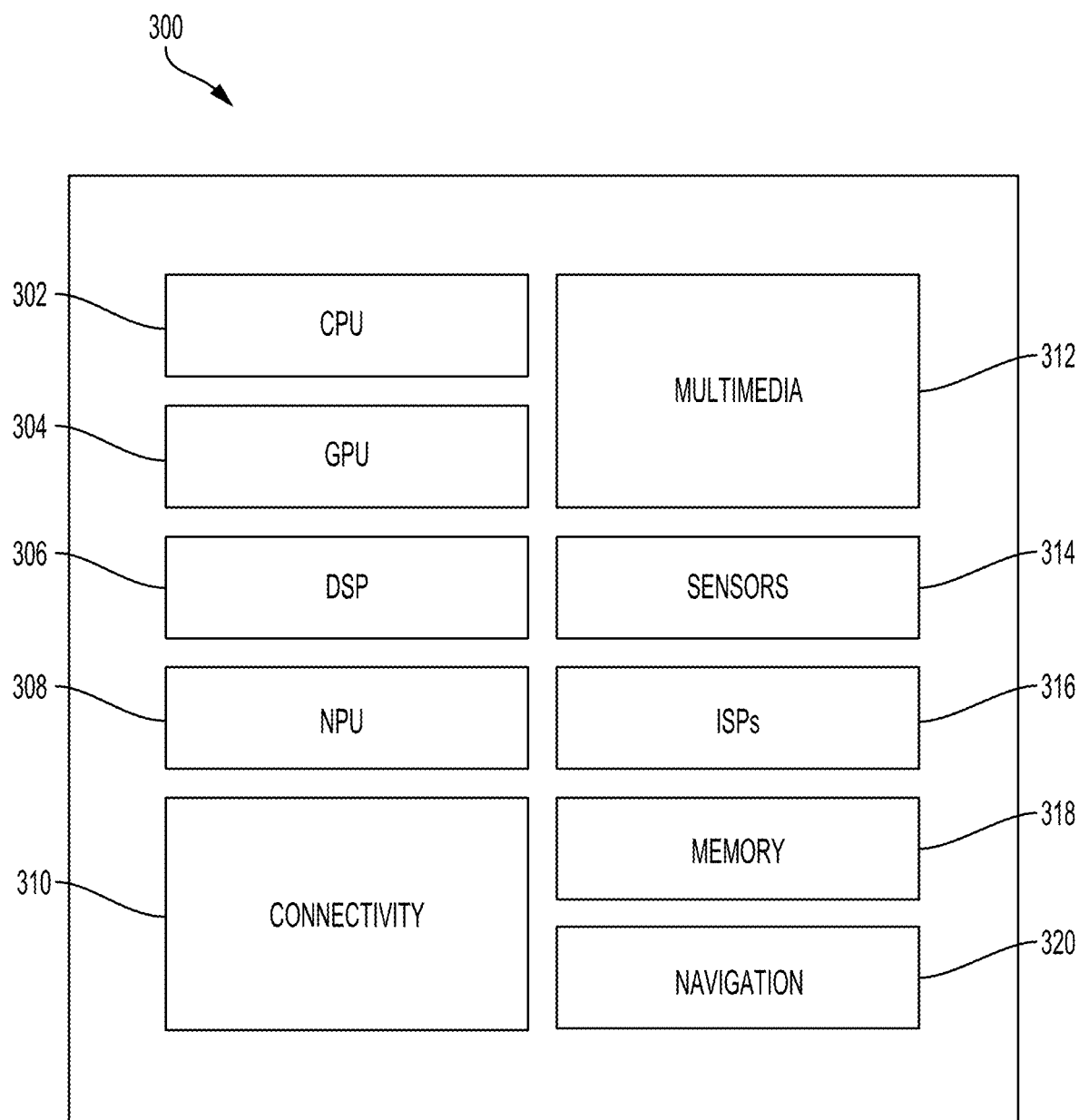
FIG. 3 illustrates an example implementation of designing a neural network using a system-on-a-chip (SOC), including a general-purpose processor in accordance with certain aspects of the present disclosure.

FIG. 3 illustrates an example implementation of a system-on-a-chip (SOC) 300, which may include a central processing unit (CPU) 302 or a multi-core CPU configured transmitting or receiving known payloads for cooperative neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to transmit, to a first transmitting device of a set of transmitting devices, a request for a first known payload for training an artificial neural network of the receiving device; code to receive, from the first transmitting device, the first known payload in response to the request; and code to update, at the receiving device, the artificial neural network based on at least the first known payload.

In another aspect of the present disclosure, the instructions loaded into the general-purpose processor 302 may comprise code to transmit, to a receiving device of a set of receiving devices, a first unknown payload based on first transmission settings of the first transmitting device; code to receive, from the receiving device, a request for a first known payload for training an artificial neural network of the receiving device; and code to transmit, to the receiving device, the first known payload based on the first transmission settings.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
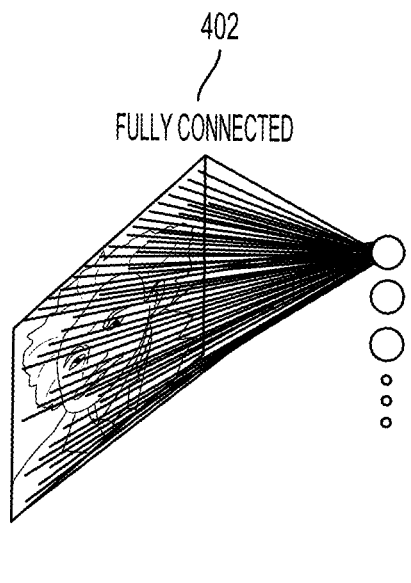
FIGS. 4A, 4B, and 4C are diagrams illustrating a neural network in accordance with aspects of the present disclosure.
Figure 4B:
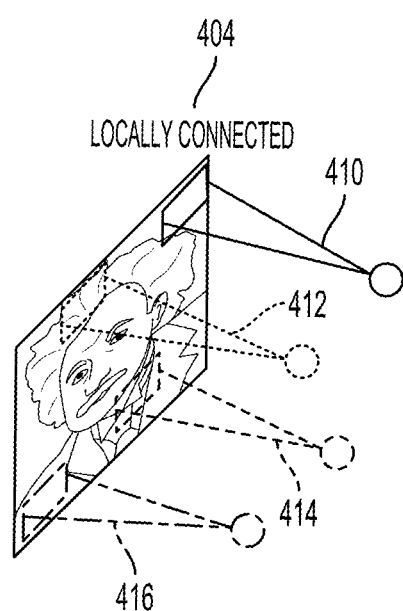

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
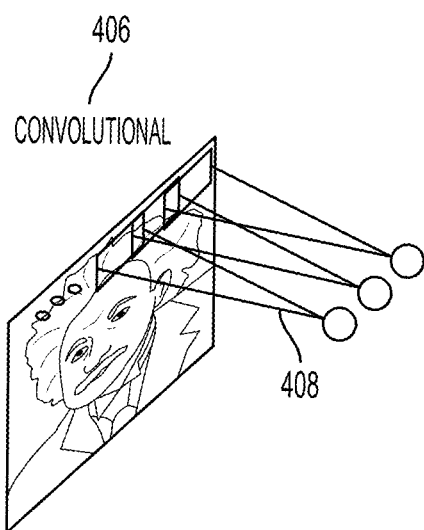

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
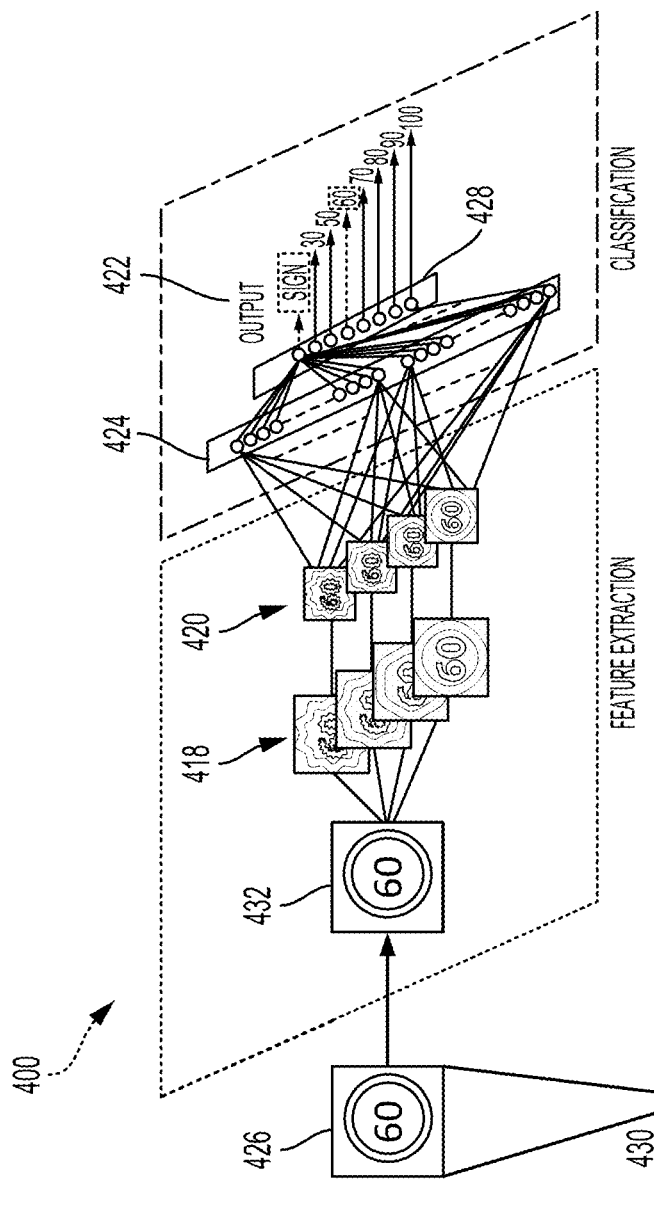
FIG. 4D is a diagram illustrating an exemplary deep convolutional network (DCN) in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
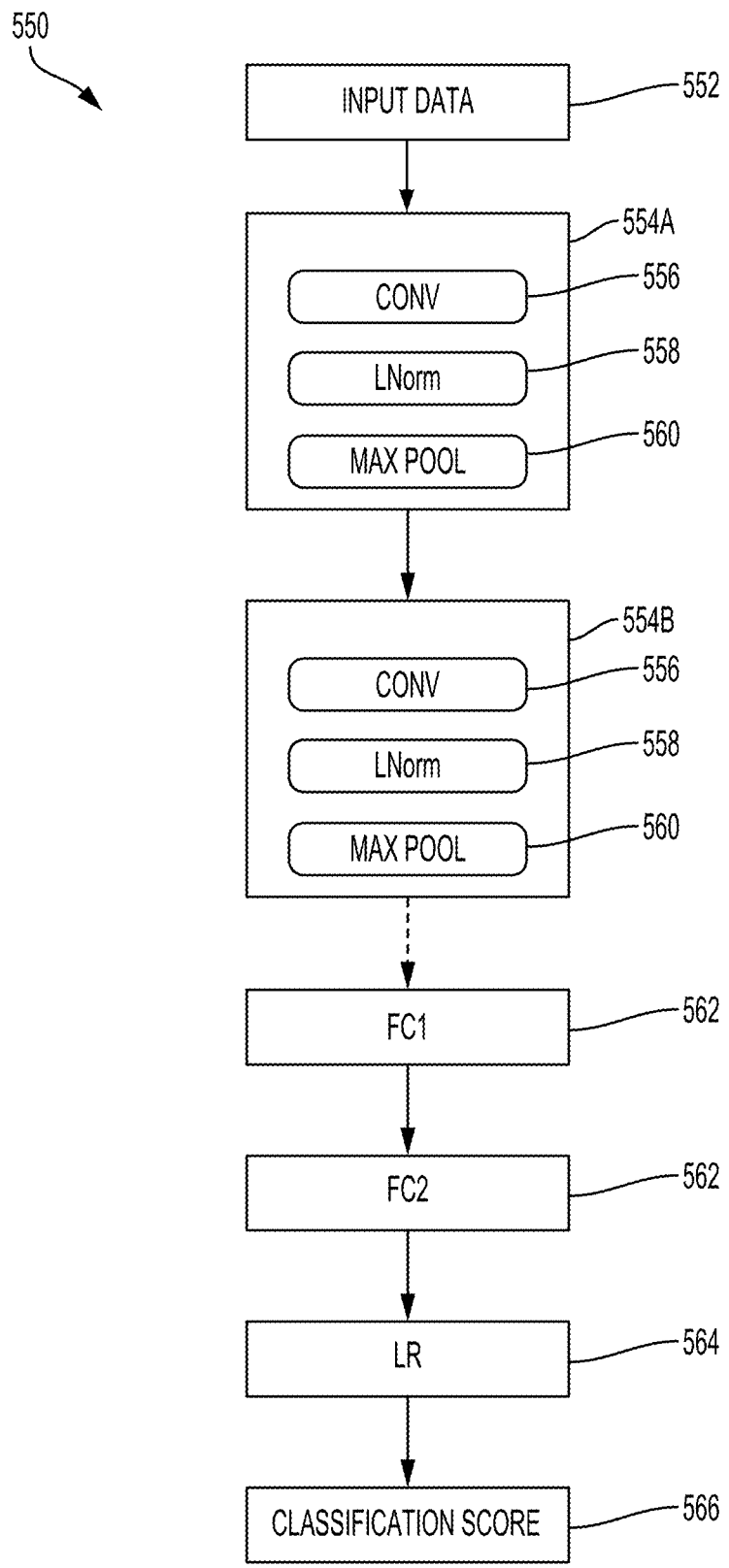
FIG. 5 is a block diagram illustrating an exemplary deep convolutional network (DCN) in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

Figure 6:
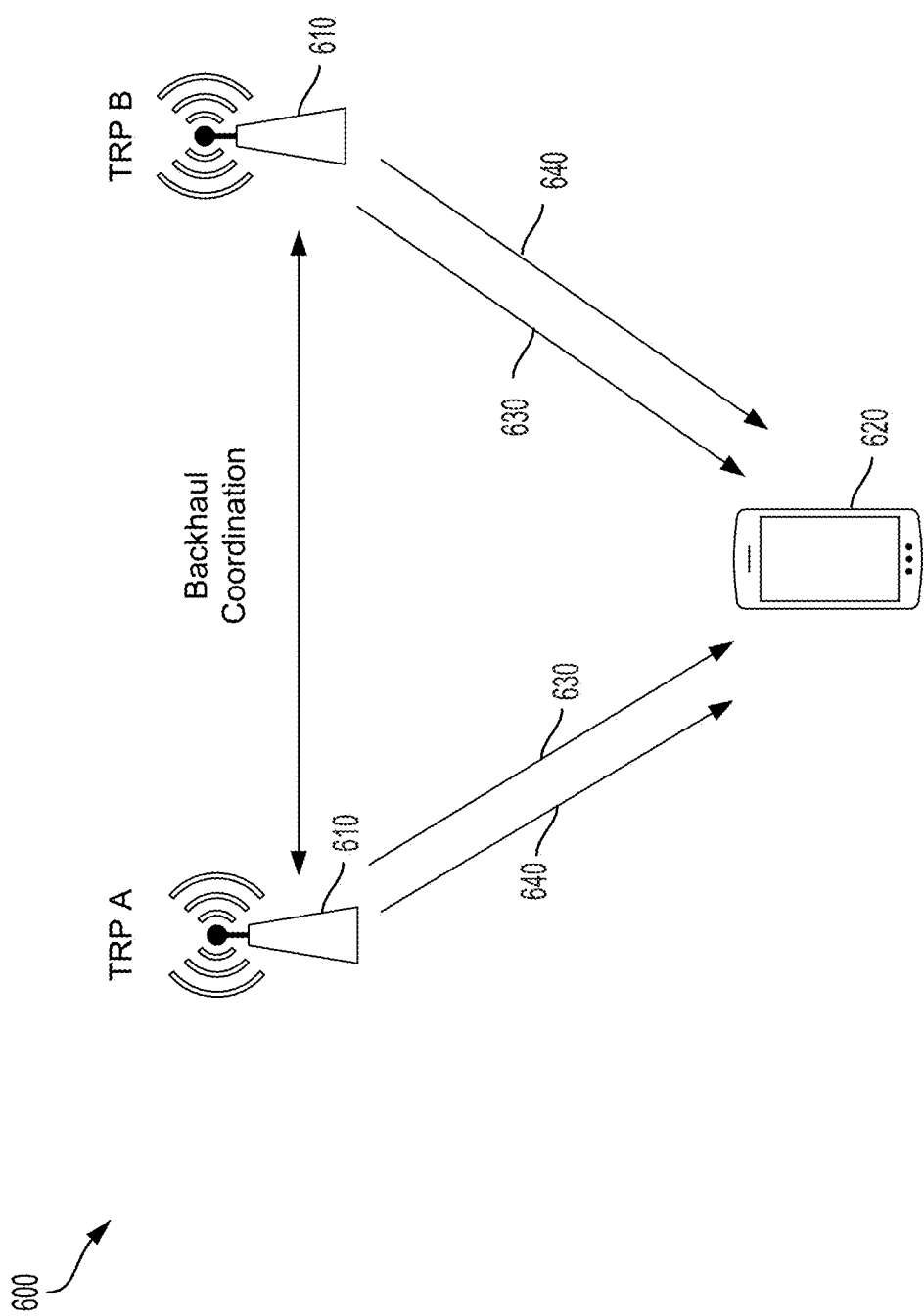
FIG. 6 is a diagram illustrating an example of multi-TRP (mTRP) communication, in accordance with various aspects of the present disclosure.

FIG. 6 is a diagram illustrating an example 600 of multi-TRP (mTRP) communication, in accordance with various aspects of the present disclosure. As shown in FIG. 6, multiple TRPs 610 (shown as TRP A and TRP B) may communicate with the same UE 620 in a coordinated manner (e.g., using coordinated multipoint transmissions and/or the like) to improve reliability, increase throughput, and/or the like. The UE 620 may be an example of the UE 120 described with reference to FIG. 1. The TRPs 610 may coordinate communication via a backhaul, which may have a smaller delay and/or a higher transmission capacity when the TRPs 610 are co-located at the same base station, such as the base station 110 described with reference to FIG. 1. The TRPs 610 may correspond to different antenna arrays of the same base station. Alternatively, a delay may increase and/or a transmission capacity may decrease when the TRPs 610 are located at different base stations. The TRPs 610 of FIG. 6 (e.g., TRP A and TRP B) may be an example of a multi-TRP group. In some examples, the multi-TRP group may be a set of TRPs 610 that communicate with the same UE, managed as a group by an access node controller, transmit a same physical downlink shared channel (PDSCH) 640, transmit individual PDSCHs 640 simultaneously or contemporaneously, and/or the like.

As shown in FIG. 6, a physical downlink control channel (PDCCH) 630 may schedule downlink communications for one or both TRPs 610. The downlink communications scheduled by the PDCCH 630 may be transmitted via a physical downlink shared channel (PDSCH) 640. In one configuration, TRP A and TRP B coordinate transmissions via the PDSCH 640. That is, TRP A and TRP B may perform the same transmission. In another configuration, TRP A and TRP B perform different transmissions via the PDSCH 640. For example, the transmissions may include one or more of a different payload, different modulation and coding schemes, different transmit powers, and/or different repetition schemes. For example, in a first multi-TRP transmission mode (e.g., Mode 1), the PDCCH 630 may schedule downlink data communications via the PDSCH 640 for both TRPs 610. In this example, both TRPs 610 (e.g., TRP A and TRP B) may transmit communications to the UE 620 on the same PDSCH 640. In another example, the TRPs 610 may independently transmit in different (e.g., disjointed) sets of resource blocks (RBs) and/or different sets of symbols. Additionally, or alternatively, the TRPs 610 may independently transmit using different layers (e.g., different multiple input multiple output (MIMO) layers). In some aspects, transmissions on different layers may occur in overlapping resource blocks and/or overlapping symbols. As another example, in a second multi-TRP transmission mode (e.g., Mode 2), multiple PDCCHs 630 may schedule downlink data communications for multiple corresponding PDSCHs 640.

As indicated above, FIGS. 3-6 are provided as examples. Other examples may differ from what is described with respect to FIGS. 3-6.

Artificial intelligence (AI)/machine learning (ML) functions can improve wireless communication at a base station and/or a user equipment (UE). An AI/ML module, such as a SOC 300 as described in reference to FIG. 3, for executing AI/ML functions may be implemented at the UE, the base station, or for distributed functions, jointly across the UE and base station. More specifically, the AI/ML module may execute a neural network or a machine learning model. Although the present disclosure can refer to the AI/ML module on the UE side, the present disclosure expressly contemplates an auto-encoder scenario. In the auto-encoder scenario, joint training occurs.

The AI/ML module may be trained to perform one or more tasks. Weights and biases of a neural network or a machine learning model may be derived from training data during an offline training phase. For ease of explanation, the examples provided below refer to a machine learning model. The present disclosure also contemplates a neural network or other types of trainable models. Prior to offline training, weights and biases may be set to a default value (e.g., initial value). Offline training, however, does not account for the dynamic real-world environment. Still, online training accounts for the dynamic real-world environment. As an example, online training can be accomplished with known over-the-air transmissions (or signaling) reflective of the wireless environment. For the online training phase (e.g., training procedure), the weights and biases may be set from a previous offline training phase. The online training may fine-tune the neural network with regard to wireless channels, noise, and/or other environmental characteristics. The online training may be referred to as re-training or updating the neural network.

As an example, a machine learning model may estimate symbols for a MIMO demapper. The machine learning model may implement a function, such as, for example, y=Hx+n, where y is the received vector, x is the transmitted symbol vector, n is the noise vector, and H is the channel matrix. The machine learning model may be trained offline to estimate x̂ (estimated symbols). Accuracy of estimates generated by the machine learning model may be improved by fine-tuning the machine learning model via online training. During an online training phase, received observations (y) and an estimated channel matrix (H) are input to the machine learning model. Additionally, the machine learning model outputs detected transmitted symbols, such as an estimated symbol x̂. In conventional systems, the device (e.g., UE or gNB) may decode y to use decoded x̂ as the ground truth data for the neural network. According to aspects of the present disclosure, the ground truth data for a known payload is used for training the neural network. Because the payloads are known, the ML model can use the training data to learn how to interpret the symbols in the presence of channel characteristics, noise characteristics, and/or the like.

The example described above is an example of using known data transmission for online training. The above example may be implemented in a network with multiple transmit and receive points (TRPs) and/or base stations, where the multiple TRPs and/or base stations transmit a known payload as training data to a given UE (given MIMO rank, MCS, etc.), and the UE uses the known data to train a machine learning model. Aspects of the present disclosure are not limited to a MIMO demapper. Other types of functions are contemplated for the machine learning model. In the current disclosure, known data may be used interchangeably with known payload.

As described, some machine learning models may be trained using known transmissions, such as a reference signal. For example, a demodulation reference signal (DMR) or a channel state information reference signal (CSI-RS) may be a type of known transmission. Reference signals, however, may not provide appropriate information for some types of machine learning models (e.g., neural networks). Certain machine learning models, such as machine learning models specified for log-likelihood ratio (LLR) computation or MIMO demapping, may use a known data transmission in addition to, or alternate from, the known transmission. The known data transmission may include a payload, such as a data message or control signaling, transmitted, for example, on a physical downlink control channel (PDCCH), a physical uplink control channel (PUCCH), a physical downlink shared channel (PDSCH), and/or a physical uplink shared channel (PUSCH).

In conventional systems, known data transmissions may be considered a known payload after the data has been decoded. In one example, the known data transmission may include, for example, system information blocks (SIBs) that are known to repeat periodically. For example, SIBS may be repeated between the boundaries when system information (SI) changes. Additionally, in conventional systems, unicast transmissions may be categorized as known transmissions in response to passing a cyclic redundancy check (CRC). In conventional systems, decoding transmissions for training the machine learning model may increase both memory use and computation overhead, resulting in high latency. For example, received modulation symbols are stored until decoding completes, thereby increasing memory use and computation overhead. The symbols may be used for training only after the decoding completes.

Thus, it may be desirable for both the base station and UE to know (e.g., agree) in advance a payload of certain physical channel transmissions. In one configuration, the known payload may be used for ground truth data for online training of a neural network. In one configuration, the known payload is transmitted from multiple TRPs and/or base stations. For ease of explanation, the examples provided below describe multiple TRPs. Still, aspects of the present disclosure are not limited to multiple TRPs; multiple TRPs and/or base stations are also contemplated.

For online training purposes, a signaling framework may enable a UE and/or multiple TRPs to train their respective neural networks (e.g., machine learning models). A known payload that is known to both sides could be beneficial in a number of contexts, as the receiver does not need to fully decode the payload to find the labels (e.g., ground truth) for training.

Figure 7:
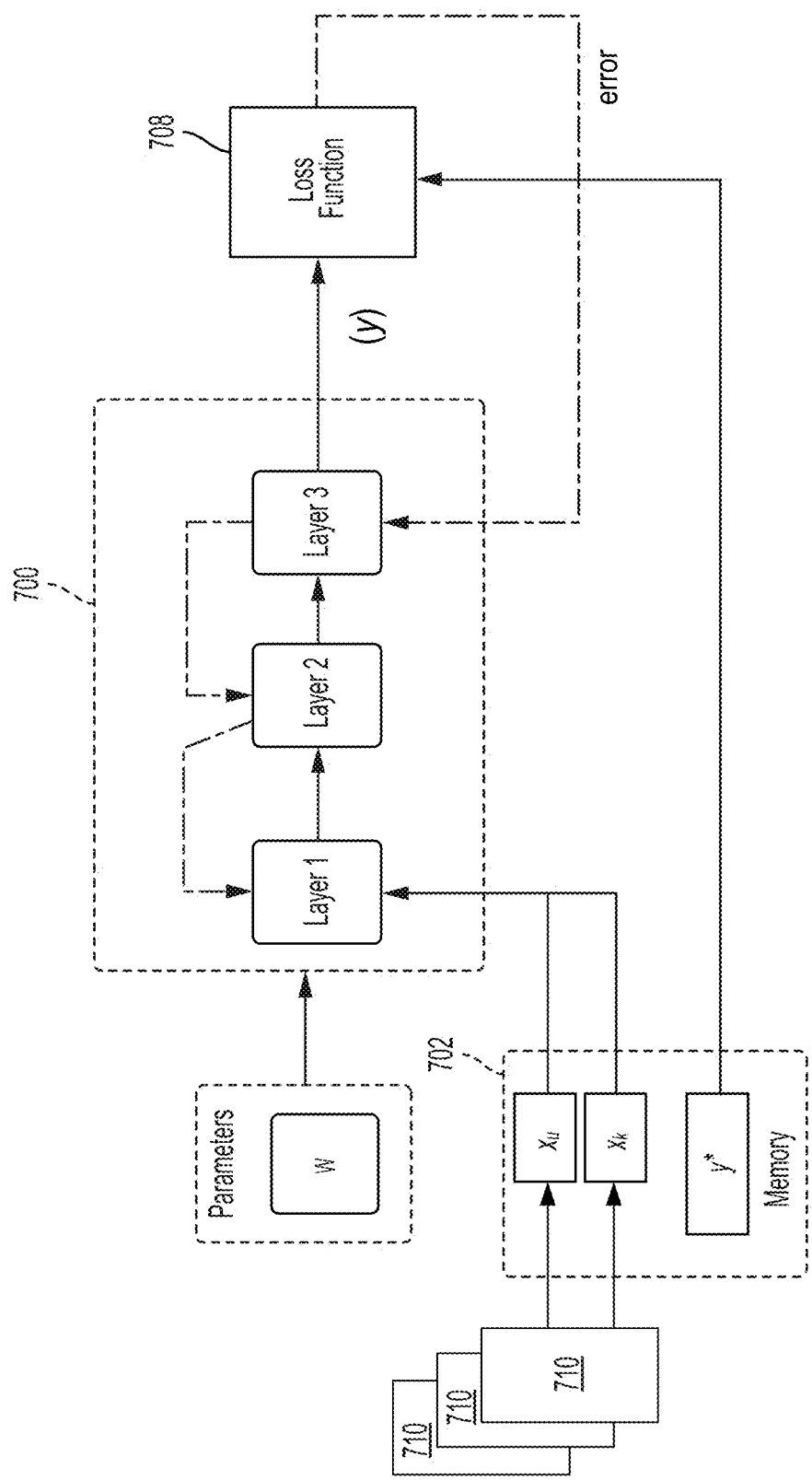
FIG. 7 is a block diagram illustrating an example of an artificial neural network, in accordance with aspects of the present disclosure.

FIG. 7 is a block diagram illustrating an example of an artificial neural network 700, in accordance with aspects of the present disclosure. In the example of FIG. 7, the neural network 700 is implemented at a device, such as a UE or a base station. The UE may be a UE 120 as described in FIG. 1, and the base station may be a base station 110, as described in FIG. 1. The base station may also be referred to as a TRP. The neural network 700 may be implemented during an offline training phase. The neural network 700 may be trained to generate an estimate (y) based on known data ($x_k$). A set of parameters (w), such as weights and biases of the neural network 700, may be learned based on the offline training. The parameters (w) may be used by layers of the neural network 700, such as layer 1, layer 2, and layer 3. Layer 3 may be a fully connected layer.

When a device, such as a UE, is deployed, the UE may update the neural network 700 to account for changes in one or more characteristics, such as channel characteristics and/or noise characteristics. Online training may be performed to account for the one or more changes. That is, one or more parameters (w) may be updated to account for the one or more changes. In one configuration, the parameters (w) are updated based on an error (e.g., error gradient) determined by a loss function 708. The loss function 708 compares an estimate (y) to a ground truth value (e.g., an expected value). The error is the difference (e.g., loss) between the estimate (y) and the ground truth value. The error is output from the loss function 708 to the neural network 700, and the error is back propagated through the neural network 700 to update the parameters (w).

As described, aspects of the present disclosure use a known payload to improve online training. In one configuration, the device stores a value (y*) of an estimate of a known payload in memory, such as a memory of the device and/or a memory associated with the neural network 700. For example, the value may be symbols estimated for a MIMO demapper in response to receiving known data ($x_k$). That is, based on the offline training, the neural network 700 may determine an estimated value (y*) should be generated in response to receiving known data ($x_k$). The known estimated value (y*) may be referred to as the ground truth data or ground truth label.

According to aspects of the present disclosure, during an online training phase, to account for changes in one or more characteristics, the device requests one or more transmitters 710, such as multiple TRPs, to transmit known data ($x_k$). The known data ($x_k$) may be processed by the neural network 700 to generate an estimate (y). In this example, due to the changed characteristics, the estimate (y) may be different from the ground truth data (y*). In this example, the loss function 708 determines the loss between the estimate (y) and the ground truth data (y*). The parameters (w) may be updated based on the loss. Updating the parameters (w) may improve an accuracy of estimates (y) generated by the neural network 700 based on unknown data ($x_u$). During online training, the known data ($x_k$) may be transmitted based on transmission settings used for transmitting unknown data ($x_u$). After training (e.g., online training and/or offline training), the loss function 708 may be excluded from a process for generating an estimate (y).

As described, multiple TRPs may transmit the known data to the UE. The transmissions may be tailored for a specific neural network. That is, the receiving device may need different types of data based on a type of neural network. Thus, a receiver-specific known payload may be generated to include data targeted for a specific receiver. For example, the multiple TRPs may transmit the known data on a specific set of beam pairs, with a specific modulation and coding scheme (MCSs), and/or with one or more specific ranks. Similarly, a UE may transmit known data to the multiple TRPs so the multiple TRPs can train their neural networks. The training data is specifically tailored to one or more particular receiving devices.

The known payload may be independently generated by the UE or the multiple TRPs. For example, the known payload can be based on a radio resource control (RRC) configured scrambling seed or can be any sequence known to both the UE and the multiple TRPs.

In one configuration, a UE request triggers the transmission of a known payload. In this configuration, the known payload is transmitted in a downlink shared channel (e.g., PDSCH). In another configuration, a request from one or more of the multiple TRPs triggers a transmission of the known payload from the UE. The UE may transmit the known payload on an uplink shared channel (e.g., PUSCH). The UE and base station request can include specific characteristics, for example, MCS, beam pair, rank, etc. The training for a specific neural network will be based on these requested characteristics.

Transmission of a known payload in a downlink shared channel for training can also be initiated by an indication transmitted by one or more of the TRPs. The indication may be transmitted in the downlink control channel or a media access control (MAC) layer control element (MAC-CE). In other configurations, transmission of the known payload in the uplink shared channel may be initiated by a UE indication. The indication may be transmitted in the uplink control channel or a MAC-CE.

In one configuration, a location of the known payload (e.g., on which physical channel) and the exact time-frequency resources, periodicity (aperiodic, semi-persistent, periodic, etc.), duration, aggregation level (for PDCCH), payload size, etc., of the known payload is explicitly signaled separately from the payload. For example, the base station can send information about the known payload. The explicit signaling can be via RRC, a MAC-CE, or via a downlink control information (DCI).

Some non-limiting examples for known data locations include a PDSCH, a PUSCH, a PUCCH, and a PDCCH. For a downlink control channel (e.g., PDCCH), the known payload can be paired with a known payload transmitted in a downlink shared channel (e.g., PDSCH) or a known payload transmitted by the UE via an uplink shared channel (e.g., PUSCH). For downlink and uplink control channels (e.g., PDCCH and PUCCH), the known payload can be periodic, aperiodic, or semi-persistent, with the parameters signaled separately, as previously described. The parameters can include a location and a time (e.g., duration) for transmission of the known payload. In the case of periodic transmissions, a semi-persistent schedule or configured grant (CG) can be defined. The known payload may be mapped to the semi-persistent schedule or the configured grant.

In one configuration, the neural network of a UE is trained based on joint transmissions from multiple TRPs. That is, known payloads from the multiple TRPs may be multiplexed and received at the UE. In one configuration, transmission settings used for transmitting unknown payloads in a deployment phase (e.g., real-world scenario) are used for transmitting the known payloads during an online and/or offline training phase. Unknown payloads may refer to data or control channel transmissions from the multiple TRPs to the UE, as well as data or control channel transmissions from the UE to the multiple TRPs. The settings may include, for example, a type of multiplexing used for the transmissions, beam pairs, ranks, modulation and coding schemes (MCSs), and/or other transmission settings.

As an example, the multiple TRPs may have different precodings. In one configuration, the UE is aware of the precodings. That is, the precodings may be known precodings. The precodings may be signaled to the UE separately from the known payload. For each TRP, a precoding used for an unknown payload in a deployment phase should be the same as the precoding used for transmitting the known payload during an offline training phase or an online training phase.

Additionally, the multiple TRPs may multiplex transmissions during the deployment phase. The multiplexing may be space division multiplexing (SDM), time division multiplexing (TDM), or frequency division multiplexing (FDM). In one configuration, the type of multiplexing used for transmitting the unknown payload in a deployment phase should be the same type of multiplexing used for transmitting the known payload during an offline training phase or an online training phase.

In one example, in a deployment phase, the TRPs use time division multiplexing for transmissions. As an example, a first TRP may transmit data, then a second TRP may transmit data, and then a third TRP may transmit data. The data from the first, second, and third TRPs may be multiplexed. In this example, the known payload is also transmitted according to time division multiplexing used for transmitting the data (e.g., unknown payload). In one configuration, ranks across multiple TRPs may be coordinated. For example, transmissions from a first TRP to the UE may be rank one, and transmissions from a second TRP to the UE may be rank two. The transmission of the known payload during the offline training phase and the online training phase may be coordinated between the multiple TRPs to follow the ranks of the TRPs used in a deployment phase.

When the known payload is transmitted on an uplink control channel, the parameters related to the known payload can be signaled separately. This signaling may be an RRC message or via a MAC-CE. The separately signaled parameters may include, for example, PUCCH format, uplink control information (UCI) types, and/or payload sizes.

Figure 8:
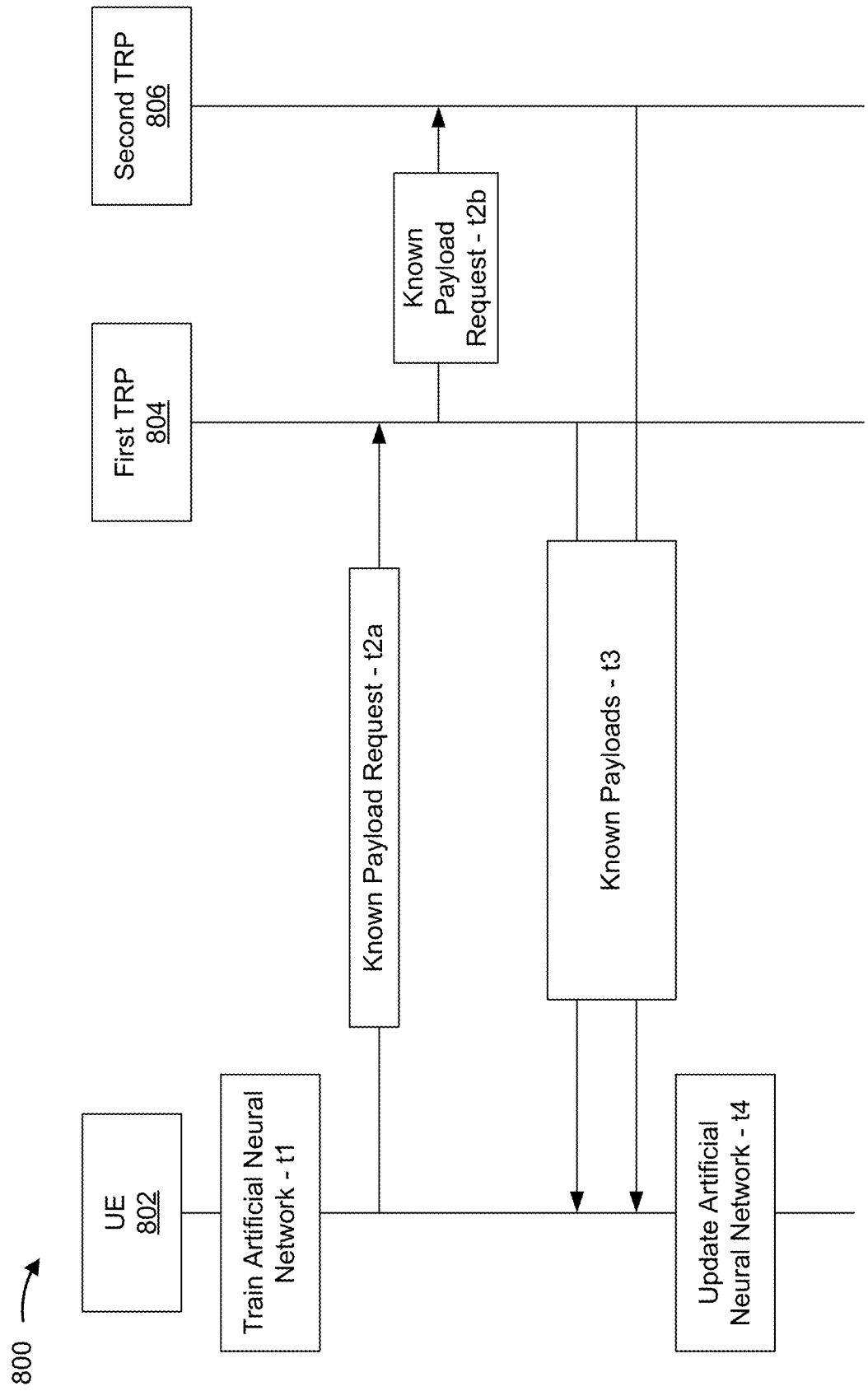
FIGS. 8 and 9 are timing diagrams illustrating examples of transmitting known payloads, in accordance with aspects of the present disclosure.

FIG. 8 is a timing diagram illustrating an example 800 for transmitting a known payload, in accordance with aspects of the present disclosure. As shown in FIG. 8, at time t1, an artificial neural network of the UE 802 is trained. The UE 802 of FIG. 8 may be one UE of a set of UEs (e.g., group of UEs). For ease of explanation, only one UE 802 is illustrated in the example of FIG. 8. The artificial neural network may be trained offline (e.g., prior to deployment of the UE 802). After the UE 802 is deployed, the UE 802 may transmit a known payload request, at time t2a, to the first TRP 804. The request may be transmitted via a physical uplink control channel (PUCCH) or a media access control layer (MAC) control element (CE). In one configuration, the known payload request indicates whether the payload is requested, for self-training (e.g., one UE) or joint training (e.g., a set of UEs). As an example, joint training may be requested for a coordinated multipoint (CoMP) group with multiple TRPs and multiple UEs, where one UE may be specified for each TRP. According to aspects of the present disclosure, the known payloads are transmitted in the same manner as unknown payloads in the CoMP group. In one configuration, the first TRP 804 is a serving TRP of a multi-TRP (mTRP) group. In the example of FIG. 8, the first TRP 804 and second TRP 806 form the multi-TRP group. The multi-TRP group is not limited to two TRPs, additional TRPs are also contemplated. As described, the known payload request may be transmitted to receive known data to update the artificial neural network. In one configuration, the known payload request may depend on a goal of the training (e.g., updating). Additionally, the known payload request may include a list of other TRPs that are requested to transmit known data. The list of other TRPs may be ranked based on a ranking criteria. For example, the list of other TRPs may be ranked from largest to smallest reference signal received power (RSRP). Furthermore, the known payload request may include transmission settings specified for training the neural network. The transmission settings may correspond to the transmission settings for unknown data. For example, the transmission settings may include a rank of each TRP of the multi-TRP group, a precoding of each TRP of the multi-TRP group, a beam pair, and/or a modulation and coding scheme (MCS).

In the example of FIG. 8, the second TRP 806 is included in the list of other TRPs. Thus, in the example of FIG. 8, at time t2b, the first TRP 804 forwards the known payload request to the second TRP 806. That is, the first TRP 804 (e.g., serving TRP) forwards the known payload request to other TRPs included in the list of other TRPs. At time t3, the TRPs 804 and 806 transmit the known payloads to the UE 802 according to the transmission settings. In the example of FIG. 8, the known payloads are transmitted in response to the known payload request transmitted by the UE 802. In another configuration, transmission of the known payload is triggered by an indication from one or more TRPs 804 and 806. The indication may be transmitted via a downlink control channel or a MAC-CE. According to aspects of the present disclosure, each TRP 804 and 806 may transmit a different known payload. Additionally, the known payloads may be multiplexed according to a multiplexing scheme, such as space division multiplexing (SDM), time division multiplexing (TDM), or frequency division multiplexing (FDM). In one configuration, prior to transmitting the known payloads, the one or more of the TRPs 804 and 806 may transmit known payload information including one or more of a periodicity, time and frequency resources, and payload size of the known payloads. The known payload information may be transmitted via radio resource control (RRC) signaling, a MAC-CE, or downlink control information (DCI). The known payloads may be transmitting on a downlink control channel (e.g., PDCCH). In one configuration, each known payload transmitted on the PDCCH may correspond to another known payload transmitted on a downlink shared channel (e.g., PDSCH). Alternatively, the known payloads may be transmitted only on the downlink shared channel. Furthermore, the known payloads may be transmitted according to a periodic schedule, a semi-persistent schedule, or aperiodically. In one configuration, the known payloads may be scrambled based on a radio resource control (RRC) scrambling seed. The payloads may be known to the UE 802, the first TRP 804, and the second TRP 806 based on the RRC scrambling seed.

In the example of FIG. 8, at time t4, the UE 802 updates the artificial neural network. The updating may be an example of re-training the artificial neural network. The updating performed at time t4 may be an online update. In one configuration, as described with respect to the example of FIG. 7, the artificial neural network generates a ground truth value based on the known payloads received from the TRPs 804 and 806. In one configuration, the artificial neural network processes each known payload to generate an estimated value. Weights and parameters of the artificial neural network may be updated by comparing the estimated values to corresponding ground truth values.

Figure 9:
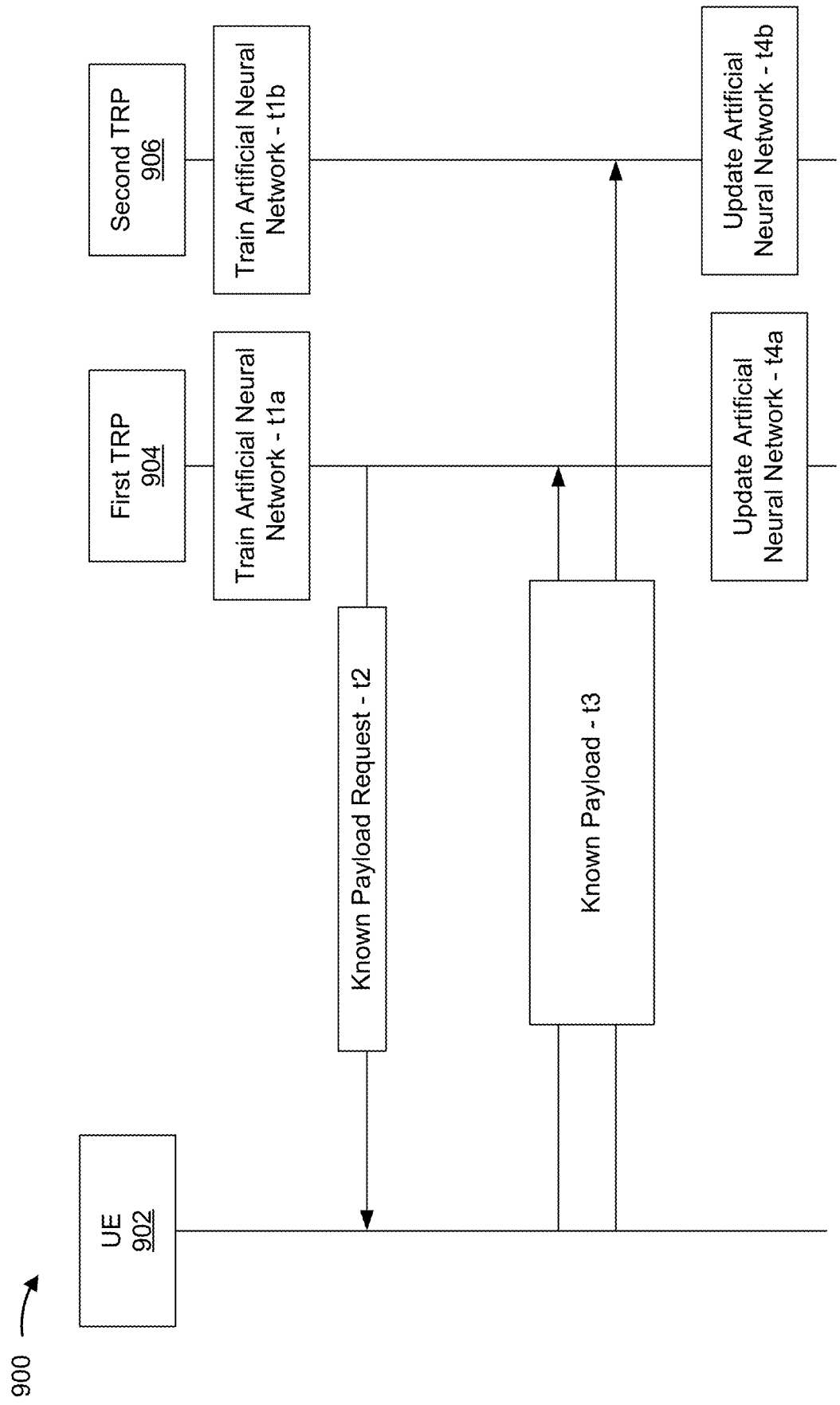

FIG. 9 is a timing diagram illustrating an example 900 of transmitting known data, in accordance with aspects of the present disclosure. As shown in FIG. 9, at time t1a, an artificial neural network of a first TRP 904 is trained. Additionally, at time t1b, an artificial neural network of a second TRP 906 is trained. The artificial neural networks may be trained offline. The first TRP 904 may be a serving TRP of a multi-TRP (mTRP) group. In the example of FIG. 9, the first TRP 904 and second TRP 906 form the multi-TRP group. The multi-TRP group is not limited to two TRPs, additional TRPs are also contemplated. Once deployed (e.g., online), one or more of the TRPs 904 and 906 may transmit a known payload request, at time t2, to the UE 902. The known payload request may be unicast to one UE 902 or groupcast to a set of UEs.

The UE 902 of FIG. 9 may be one UE of a set of UEs (e.g., group of UEs). For ease of explanation, only one UE 902 is illustrated in the example of FIG. 9. The request may be transmitted via a physical downlink control channel (PUCCH) or a media access control layer (MAC) control element (CE). As described, the known payload request may be transmitted to receive known data to update the artificial neural network. In one configuration, the known payload request may depend on a goal of the training (e.g., updating). Furthermore, the known payload request may include transmission settings specified for training the neural network. The transmission settings may correspond to the transmission settings for unknown data. For example, the transmission settings may include a beam pair, and/or a modulation and coding scheme (MCS).

At time t3, the UE 902 transmits the known payload to the TRPs 904 and 906 according to the transmission settings. The UE 902 may transmit the same known payload to the TRPs 904 and 906 or different known payloads to each TRP 904 and 906. In the example of FIG. 9, the known payload is transmitted in response to the known payload request transmitted by the one or more TRPs 904 and 906. In another configuration, the known payload transmission may be triggered by an indication from the UE 902. The notification may be transmitted via an uplink control channel or a MAC-CE. In one configuration, prior to transmitting the known payloads, the UE 902 may transmit known payload information including one or more of a periodicity, time and frequency resources, and payload size of the known payload. The known payload information may be transmitted via radio resource control (RRC) signaling or a MAC-CE. The known payload may be transmitting on an uplink control channel (e.g., PUCCH). In one configuration, the known payload transmitted on the PUCCH may correspond to a known payload transmitted on an uplink shared channel (e.g., PUSCH). Alternatively, the known payloads may be transmitted only on the uplink shared channel. Furthermore, the known payloads may be transmitted according to a periodic schedule, a semi-persistent schedule, or aperiodically. In one configuration, the known payloads may be scrambled based on a radio resource control (RRC) scrambling seed. The payloads may be known to the UE 902, the first TRP 904, and the second TRP 906 based on the RRC scrambling seed.

In the example of FIG. 9, at time t4a, the first TRP 904, updates the artificial neural network. Additionally, at time t4b, the second TRP 906 updates the artificial neural network. The updating may be an example of re-training the artificial neural network. The updating performed at times t4a and t4b may be an online update. In one configuration, as described with respect to the example of FIG. 7, the artificial neural network generates a ground truth value based on the known payload received from the UE 902. In one configuration, the artificial neural network processes each known payload to generate an estimated value. Weights and parameters of the artificial neural network may be updated by comparing the estimated values to corresponding ground truth values.

Figure 10:
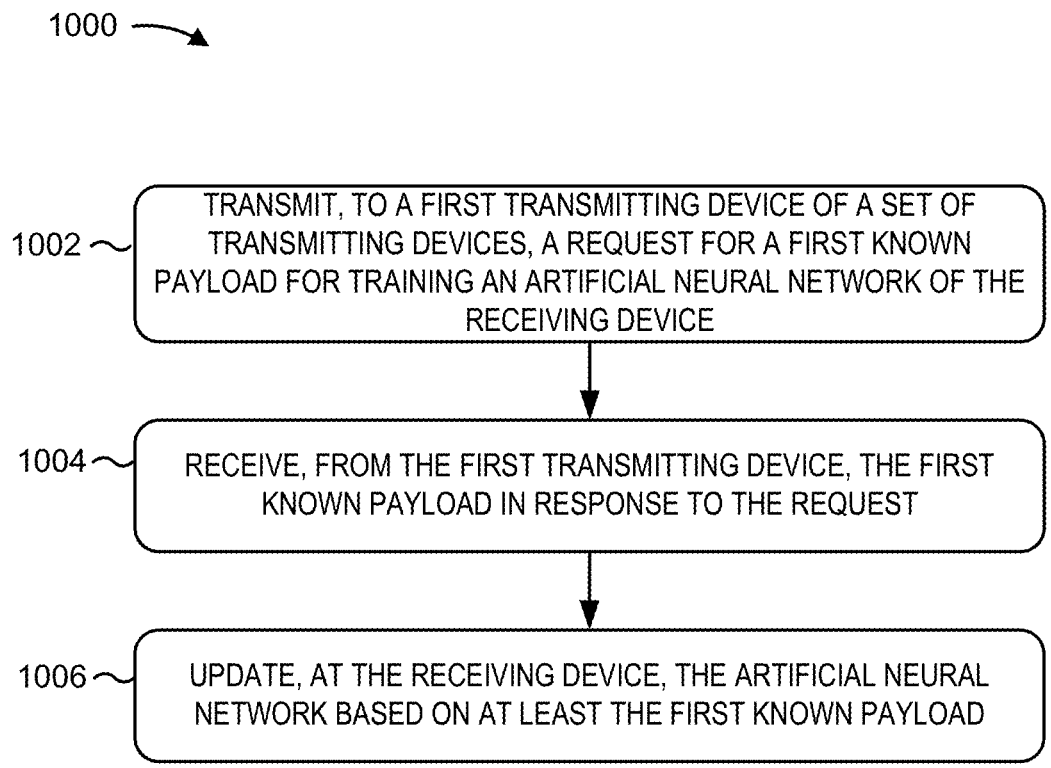
FIG. 10 is a diagram illustrating an example process performed, for example, by a receiving device, in accordance with various aspects of the present disclosure.

FIG. 10 is a diagram illustrating an example process 1000 performed, for example, by a receiving device, in accordance with various aspects of the present disclosure. The example process 1000 is an example of requesting a known payload, for example, for training artificial neural networks.

As shown in FIG. 10, in some aspects, the process 1000 may include transmitting, to a first transmitting device of a set of transmitting devices, a request for a first known payload for training an artificial neural network of the receiving device (block 1002). For example, the receiving device (e.g., using the antenna 252, DEMOD/MOD 254, TX MIMO processor 266, transmit processor 264, controller/processor 280, and/or memory 282) can transmit, to a first transmitting device of a set of transmitting devices, a request for a first known payload for training an artificial neural network of the receiving device. The process 1000 may also include receiving, from the first transmitting device, the first known payload in response to the request (block 1004). For example, the receiving device (e.g., using the antenna 252, DEMOD/MOD 254, MIMO detector 256, receive processor 258, controller/processor 280, and/or memory 282) can receive, from the first transmitting device, the first known payload in response to the request. The process 1000 may include updating, at the receiving device, the artificial neural network based on at least the first known payload (block 1006). For example, the receiving device (e.g., using the antenna 252, DEMOD/MOD 254, MIMO detector 256, TX MIMO processor 266, receive processor 258, transmit processor 264, controller/processor 280, and/or memory 282) can update, at the receiving device, the artificial neural network based on at least the first known payload.

Figure 11:
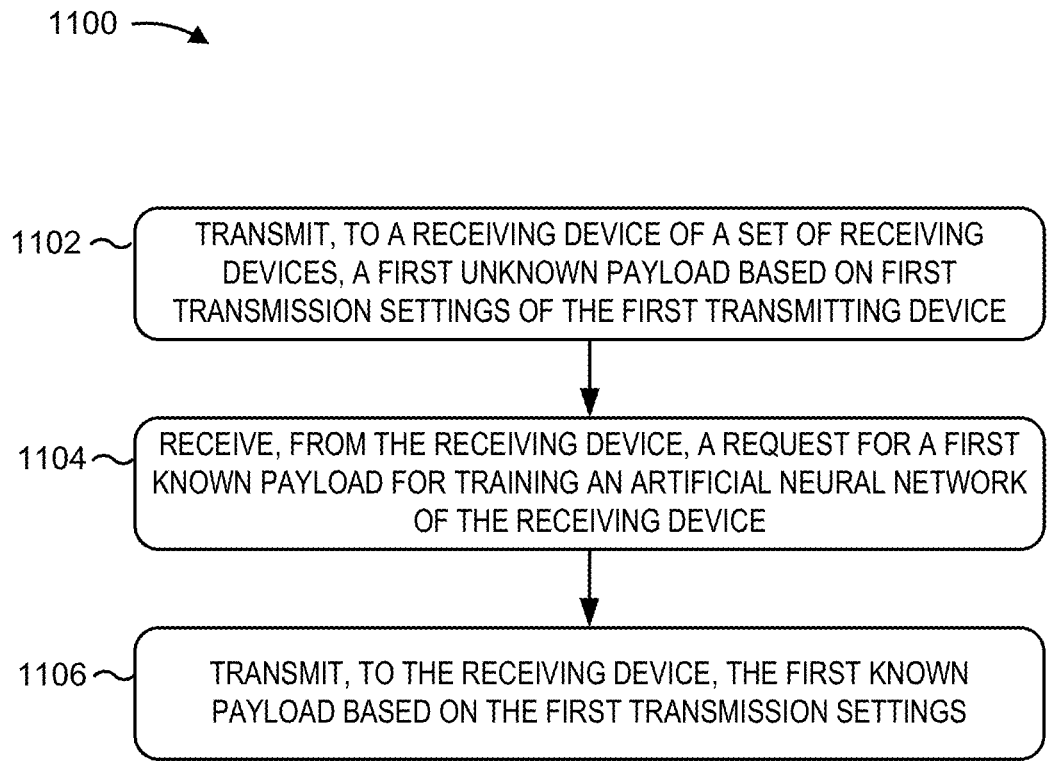
FIG. 11 is a diagram illustrating an example process performed, for example, by a transmitting device, in accordance with various aspects of the present disclosure.

FIG. 11 is a diagram illustrating an example process 1100 performed, for example, by a transmission device, in accordance with various aspects of the present disclosure. The example process 1100 is an example of transmitting known data for training artificial neural networks.

As shown in FIG. 11, in some aspects, the process 1100 may include transmitting, to a receiving device of a set of receiving devices, a first unknown payload based on first transmission settings of the first transmitting device (block 1102). For example, the transmitting device (e.g., using the antenna 252, DEMOD/MOD 254, TX MIMO processor 266, transmit processor 264, controller/processor 280, and/or memory 282) can transmit, to a receiving device of a set of receiving devices, a first unknown payload based on first transmission settings of the first transmitting device. The process 1100 may also include receiving, from the receiving device, a request for a first known payload for training an artificial neural network of the receiving device (block 1104). For example, the transmitting device (e.g., using the antenna 252, DEMOD/MOD 254, MIMO detector 256, receive processor 258, controller/processor 280, and/or memory 282) can receive, from the receiving device, a request for a first known payload for training an artificial neural network of the receiving device. The process 1100 may further include transmitting, to the receiving device, the first known payload based on the first transmission settings (block 1106). For example, the transmitting device (e.g., using the antenna 252, DEMOD/MOD 254, TX MIMO processor 266, transmit processor 264, controller/processor 280, and/or memory 282) can transmit, to the receiving device, the first known payload based on the first transmission settings.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a receiving device, comprising:
   transmitting, to a first transmitting device of a set of transmitting devices, a message including:
   a request for a first known payload from the first transmitting device and a second known payload from a second transmitting device of the set of transmitting devices; and
   first transmission settings, for the first known payload and the second known payload, comprising at least one of a multiplexing scheme, a rank of each TRP of a multi-TRP group, a precoding of each TRP of the multi-TRP group, a beam pair, a modulation and coding scheme (MCS), or a combination thereof, the first known payload and the second known payload requested for training an artificial neural network of the receiving device, first data within the first known payload being known to both the receiving device and the first transmitting device prior to transmitting the request, and second data within the second known payload being known to both the receiving device and the second transmitting device prior to transmitting the request;
   receiving, from the first transmitting device, the first known payload in response to the request;
   receiving, from the second transmitting device, the second known payload in response to the request, the second known payload multiplexed with the first known payload; and
   updating, at the receiving device, the artificial neural network based on receiving the first known payload and the second known payload.

2. The method of claim 1, in which:
   the set of transmitting devices comprises a set of TRPs of a multi-TRP group;
   the first transmitting device is a serving transmit and receive point (TRP) of the set of TRPs;
   the second transmitting device is a non-serving TRP of the set of TRPs; and
   the receiving device is a user equipment (UE).

3. The method of claim 2, in which the UE is one UE in a group of UEs.

4. The method of claim 2, in which the first transmission settings for the first known payload and the second known payload are the same as second transmission settings for a first unknown payload from the serving TRP and a second unknown payload from the non-serving TRP, third data within the first unknown payload and fourth data within the second unknown payload being unknown to the UE prior to receiving the first unknown payload and the second unknown payload.

5. The method of claim 2, in which the first known payload is different from the second known payload.

6. The method of claim 2, in which the multiplexing scheme comprises space division multiplexing (SDM), time division multiplexing (TDM), or frequency division multiplexing (FDM).

7. The method of claim 2, further comprising receiving information comprising a periodicity, time and frequency resources, and payload size of the first known payload and the second known payload, in which the information is received via radio resource control (RRC) signaling, a media access control layer (MAC) control element, or downlink control information (DCI).

8. The method of claim 2, further comprising receiving the first known payload and the second known payload on a physical downlink control channel (PDCCH), each of the first known payload and the second known payload paired with a payload received on a physical downlink shared channel (PDSCH).

9. The method of claim 2, further comprising receiving the first known payload and the second known payload according to a periodic schedule, a semi-persistent schedule, or aperiodically.

10. The method of claim 2, in which the first known payload and the second known payload are scrambled based on a radio resource control (RRC) scrambling seed.

11. The method of claim 10, in which the first known payload and the second known payload are known to the UE, the serving TRP, and the non-serving TRP based on the RRC scrambling seed.

12. The method of claim 1, in which the requesting is transmitted via a physical uplink control channel (PUCCH) or a media access control layer (MAC) control element (CE).

13. The method of claim 12, in which the first known payload is received in a physical downlink shared channel (PDSCH).

14. The method of claim 1, further comprising training the artificial neural network during an offline training phase, in which updating the artificial neural network comprises re-training the artificial neural network during an online training phase.

15. The method of claim 1, further comprising generating a ground truth value for training of the artificial neural network from the first known payload.

16. The method of claim 15, further comprising:
processing the first known payload by the artificial neural network to generate an estimated value; and
updating weights and parameters of the artificial neural network by comparing the estimated value to the ground truth value.

17. The method of claim 1, in which:
the first transmitting device is a first user equipment (UE);
the second transmitting device is a second UE;
the receiving device is a transmit and receive point (TRP) of a multi-TRP group; and
the request indicates transmission settings comprising at least one of a multiplexing scheme, a modulation and coding scheme (MCS), or a combination thereof.

18. The method of claim 17, in which the set of transmitting devices comprises a set of UEs.

19. The method of claim 17, further comprising receiving the first known payload via a physical uplink control channel (PUCCH).

20. The method of claim 19, further comprising receiving the second known payload via a physical uplink shared channel (PUSCH), the first known payload paired with the second known payload.

21. The method of claim 17, in which the request is transmitted via a physical downlink control channel (PDCCH) or a media access control layer (MAC) control element (CE).

22. An apparatus for wireless communication at a receiving device, the apparatus comprising:
a processor;
a memory coupled with the processor; and
instructions stored in the memory and operable, when executed by the processor, to cause the apparatus:
to transmit, to a first transmitting device of a set of transmitting devices, a message comprising:
a request for a first known payload from the first transmitting device and a second known payload from a second transmitting device of the set of transmitting devices; and
first transmission settings, for the first known payload and the second known payload, comprising at least one of a multiplexing scheme, a rank of each TRP of a multi-TRP group, a precoding of each TRP of the multi-TRP group, a beam pair, a modulation and coding scheme (MCS), or a combination thereof, the first known payload and the second known payload requested for training an artificial neural network of the receiving device, first data within the first known payload being known to both the receiving device and the first transmitting device prior to transmitting the request, and second data within the second known payload being known to both the receiving device and the second transmitting prior to transmitting the request;
to receive, from the first transmitting device, the first known payload in response to the request;
to receive, from the second transmitting device, the second known payload in response to the request, the second known payload multiplexed with the first known payload; and
to update, at the receiving device, the artificial neural network based on receiving the first known payload and the second known payload.

23. The apparatus of claim 22, in which:
the set of transmitting devices comprises a set of TRPs of a multi-TRP group;
the first transmitting device is a serving transmit and receive point (TRP) of the set of TRPs;
the second transmitting device is a non-serving TRP of the set of TRPs; and
the receiving device is a user equipment (UE).

24. The apparatus of claim 23, in which the UE is one UE in a group of UEs.

25. The apparatus of claim 23, in which the first transmission settings for the first known payload and the second known payload are the same as second transmission settings for a first unknown payload from the serving TRP and a second unknown payload from the non-serving TRP, third data within the first unknown payload and fourth data within the second unknown payload being unknown to the UE prior to receiving the first unknown payload and the second unknown payload.

26. The apparatus of claim 23, in which the first known payload is different from the second known payload.

27. The apparatus of claim 23, in which the multiplexing scheme comprises space division multiplexing (SDM), time division multiplexing (TDM), or frequency division multiplexing (FDM).

28. The apparatus of claim 23, in which the instructions further cause the apparatus to receive information comprising a periodicity, time and frequency resources, and payload size of the first known payload and the second known payload, in which the information is received via radio resource control (RRC) signaling, a media access control layer (MAC) control element, or downlink control information (DCI).

29. The apparatus of claim 23, in which the instructions further cause the apparatus to receive the first known payload and the second known payload on a physical downlink control channel (PDCCH), each of the first known payload and the second known payload paired with a payload received on a physical downlink shared channel (PDSCH).

30. The apparatus of claim 23, in which the instructions further cause the apparatus to receive the first known payload and the second known payload according to a periodic schedule, a semi-persistent schedule, or aperiodically.

31. The apparatus of claim 23, in which the first known payload and the second known payload are scrambled based on a radio resource control (RRC) scrambling seed.

32. The apparatus of claim 31, in which the first known payload and the second known payload are known to the UE, the serving TRP, and the non-serving TRP based on the RRC scrambling seed.

33. The apparatus of claim 22, in which the requesting is transmitted via a physical uplink control channel (PUCCH) or a media access control layer (MAC) control element (CE).

34. The apparatus of claim 33, in which the first known payload is received in a physical downlink shared channel (PDSCH).

35. The apparatus of claim 22, in which the instructions further cause the apparatus to train the artificial neural network during an offline training phase, in which the instructions for causing the apparatus to update the artificial neural network comprise instructions for causing the apparatus to re-train the artificial neural network during an online training phase.

36. The apparatus of claim 22, in which the instructions further cause the apparatus to generate a ground truth value for training of the artificial neural network from the first known payload.

37. The apparatus of claim 36, in which the instructions further cause the apparatus:
to process the first known payload by the artificial neural network to generate an estimated value; and
to update weights and parameters of the artificial neural network by comparing the estimated value to the ground truth value.

38. The apparatus of claim 22, in which:
the first transmitting device is a first user equipment (UE);
the second transmitting device is a second UE;
the receiving device is a transmit and receive point (TRP) of a multi-TRP group; and
the request indicates transmission settings comprising at least one of a multiplexing scheme, a modulation and coding scheme (MCS), or a combination.

39. The apparatus of claim 38, in which the set of transmitting devices comprises a set of UEs.

40. The apparatus of claim 38, in which the instructions further cause the apparatus to receive the first known payload via a physical uplink control channel (PUCCH).

41. The apparatus of claim 40, in which the instructions further cause the apparatus to receive the second known payload via a physical uplink shared channel (PUSCH), the first known payload paired with the second known payload.

42. The apparatus of claim 38, in which the request is transmitted via a physical downlink control channel (PDCCH) or a media access control layer (MAC) control element (CE).

43. A receiving device for wireless communication, the receiving device comprising:
means for transmitting, to a first transmitting device of a set of transmitting devices, a message including:
a request for a first known payload from the first transmitting device and a second known payload from a second transmitting device of the set of transmitting devices; and
first transmission settings, for the first known payload and the second known payload, comprising at least one of a multiplexing scheme, a rank of each TRP of a multi-TRP group, a precoding of each TRP of the multi-TRP group, a beam pair, a modulation and coding scheme (MCS), or a combination thereof, the first known payload and the second known payload requested for training an artificial neural network of the receiving device, first data within the first known payload being known to both the receiving device and the first transmitting device prior to transmitting the request, and second data within the second known payload being known to both the receiving device and the second transmitting prior to transmitting the request;
means for receiving, from the first transmitting device, the first known payload in response to the request;
means for receiving, from the second transmitting device, the second known payload in response to the request, the second known payload multiplexed with the first known payload; and
means for updating, at the receiving device, the artificial neural network based on receiving the first known payload and the second known payload.

44. The receiving device of claim 43, in which:
the set of transmitting devices comprises a set of TRPs of a multi-TRP group;
the first transmitting device is a serving transmit and receive point (TRP) of the set of TRPs;
the second transmitting device is a non-serving TRP of the set of TRPs; and
the receiving device is a user equipment (UE).

45. The receiving device of claim 44, in which the first transmission settings for the first known payload and the second known payload are the same as second transmission settings for a first unknown payload from the serving TRP and a second unknown payload from the non-serving TRP, third data within the first unknown payload and fourth data within the second unknown payload being unknown to the UE prior to receiving the first unknown payload and the second unknown payload.

46. The receiving device of claim 44, in which the first known payload is different from the second known payload.

47. The receiving device of claim 43, further comprising means for training the artificial neural network during an offline training phase, in which the means for updating the artificial neural network comprises means for re-training the artificial neural network during an online training phase.

48. The receiving device of claim 43, further comprising means for generating a ground truth value for training of the artificial neural network from the first known payload.

49. The receiving device of claim 48, further comprising:
means for processing the first known payload by the artificial neural network to generate an estimated value; and
means for updating weights and parameters of the artificial neural network by comparing the estimated value to the ground truth value.

50. The receiving device of claim 43, in which:
the first transmitting device is a first user equipment (UE);
the second transmitting device is a second UE;
the receiving device is a transmit and receive point (TRP) of a multi-TRP group; and
the request indicates transmission settings comprising at least one of a multiplexing scheme, a modulation and coding scheme (MCS), or a combination thereof.

51. The receiving device of claim 50, in which the set of transmitting devices comprises a set of UEs.

52. A non-transitory computer-readable medium having program code recorded thereon for wireless communication by a receiving device, the program code executed by a processor and comprising:
program code to transmit, to a first transmitting device of a set of transmitting devices, a message including:
a request for a first known payload from the first transmitting device and a second known payload from a second transmitting device of the set of transmitting devices; and
first transmission settings, for the first known payload and the second known payload, comprising at least one of a multiplexing scheme, a rank of each TRP of a multi-TRP group, a precoding of each TRP of the multi-TRP group, a beam pair, a modulation and coding scheme (MCS), or a combination thereof, the first known payload and the second known payload requested for training an artificial neural network of the receiving device, first data within the first known payload being known to both the receiving device and the first transmitting device prior to transmitting the request, and second data within the second known payload being known to both the receiving device and the second transmitting prior to transmitting the request;

program code to receive, from the first transmitting device, the first known payload in response to the request;

program code to receive, from the second transmitting device, the second known payload in response to the request, the second known payload multiplexed with the first known payload; and program code to update, at the receiving device, the artificial neural network based on receiving the first known payload and the second known payload.

53. A method of wireless communication performed by at least a first transmitting device of a set of transmitting devices, comprising:

transmitting, to a receiving device of a set of receiving devices, a first unknown payload based on first transmission settings of the first transmitting device, first data within the first unknown payload being unknown to the receiving device prior to transmitting the first unknown payload;

receiving, from the receiving device, a first request for a first known payload for training an artificial neural network of the receiving device, the first request indicating second transmission settings for the first known payload, the second transmission settings comprising at least one of a rank, a beam pair, a modulation and coding scheme (MCS), or a combination thereof, second data within the first known payload being known to both the receiving device and the first transmitting device prior to receiving the request; and transmitting, to the receiving device, the first known payload based on the first transmission settings.

54. The method of claim 53, in which:
the receiving device is a user equipment (UE);
the first transmitting device is a serving transmit and receive point (TRP); and
the set of transmitting devices comprises a multi-TRP group.

55. The method of claim 54, in which:
the set of receiving devices comprises a group of UEs; and
transmitting the first known payload comprises transmitting the first known payload to each UE of the group of UEs.

56. The method of claim 54, in which:
the first request further comprises a second request for a second known payload from a second TRP of the multi-TRP group and third transmission settings for the first known payload and the second known payload, third data within the second known payload being known to both the receiving device and the second TRP prior to receiving the second request;
the third transmission settings indicate at least one of a multiplexing scheme, a rank of each TRP of the multi-TRP group, a precoding of each TRP of the multi-TRP group, a beam pair, a modulation and coding scheme (MCS), or a combination thereof; and
the method further comprises transmitting the second known payload from the second TRP.

57. The method of claim 56, in which the third transmission settings for the first known payload and the second known payload are the same as the first transmission settings for the first unknown payload and a second unknown payload from the second TRP, fourth data within the second unknown payload being unknown to the receiving device prior to transmitting the second unknown payload.

58. The method of claim 56, in which the first known payload is different from the second known payload.

59. The method of claim 56, in which the multiplexing scheme comprises space division multiplexing (SDM), time division multiplexing (TDM), or frequency division multiplexing (FDM).

60. The method of claim 56, further comprising transmitting information comprising a periodicity, time and frequency resources, and payload size of the first known payload and the second known payload, in which the information is transmitted via radio resource control (RRC) signaling, a media access control layer (MAC) control element, or downlink control information (DCI).

61. The method of claim 56, in which the first known payload and the second known payload are transmitted on a physical downlink control channel (PDCCH), each of the first known payload and the second known payload paired with a corresponding payload transmitted on a physical downlink shared channel (PDSCH).

62. The method of claim 56, further comprising transmitting information comprising a periodicity, time and frequency resources, and payload size of the first known payload, in which the information is received via radio resource control (RRC) signaling, a media access control layer (MAC) control element, or downlink control information (DCI).

63. The method of claim 56, in which the first known payload and the second known payload are transmitted according to a periodic schedule, a semi-persistent schedule, or aperiodically.

64. The method of claim 56, further comprising scrambling the first known payload and the second known payload based on a radio resource control (RRC) scrambling seed.

65. The method of claim 64, in which the first known payload and the second known payload are known based on the RRC scrambling seed.

66. The method of claim 53, in which the first request is received via a physical uplink control channel (PUCCH) or a media access control layer (MAC) control element (CE).

67. The method of claim 66, further comprising transmitting the first known payload via a physical downlink shared channel (PDSCH).

68. The method of claim 53, in which:
the first transmitting device is a first user equipment (UE);
the receiving device is a transmit and receive point (TRP) of a multi-TRP group;
transmitting the first known payload comprises transmitting the first known payload to each TRP of the multi-TRP group.

69. The method of claim 68, in which:
the set of transmitting devices comprises a set of UEs;
the first request further comprises a second request for a second known payload from a second UE of the set of UEs, third data within the second known payload being known to the TRP and the second UE prior to receiving the second request for the second known payload; and
the second transmission settings comprise transmission settings for the second known payload.

70. The method of claim 68, in which the second transmission settings for the first known payload are the same as the first transmission settings for the first unknown payload.

71. The method of claim 68, further comprising transmitting the first known payload via a physical uplink control channel (PUCCH).

72. The method of claim 71, further comprising transmitting a second known payload via a physical uplink shared channel (PUSCH), the first known payload paired with the second known payload, third data within the second known payload being known to both the TRP and the first UE prior to transmitting the second known payload.

73. The method of claim 68, in which the first request is received via a physical downlink control channel (PDCCH) or a media access control layer (MAC) control element (CE).

74. An apparatus for wireless communication at a first transmitting device of a set of transmitting devices, comprising:
a processor;
a memory coupled with the processor; and
instructions stored in the memory and operable, when executed by the processor, to cause the apparatus:
to transmit, to a receiving device of a set of receiving devices, a first unknown payload based on first transmission settings of the first transmitting device, first data within the first unknown payload being unknown to the receiving device prior to transmitting the first unknown payload;
to receive, from the receiving device, a first request for a first known payload for training an artificial neural network of the receiving device, the first request indicating second transmission settings for the first known payload, the second transmission settings comprising at least one of a rank, a beam pair, a modulation and coding scheme (MCS), or a combination thereof, second data within the first known payload being known to both the receiving device and the first transmitting device prior to receiving the first request; and
to transmit, to the receiving device, the first known payload based on the first transmission settings.

75. The apparatus of claim 74, in which:
the receiving device is a user equipment (UE);
the first transmitting device is a serving transmit and receive point (TRP); and
the set of transmitting devices comprises a multi-TRP group.

76. The apparatus of claim 75, in which:
the set of receiving devices comprises a group of UEs; and
the instructions further cause the apparatus to transmit the first known payload to each UE of the group of UEs.

77. The apparatus of claim 75, in which:
the first request further comprises a second request for a second known payload from a second TRP of the multi-TRP group and third transmission settings for the first known payload and the second known payload, third data within the second known payload being known to both the receiving device and the second TRP prior to receiving the second request; and
the third transmission settings indicate at least one of a multiplexing scheme, a rank of each TRP of the multi-TRP group, a precoding of each TRP of the multi-TRP group, a beam pair, a modulation and coding scheme (MCS), or a combination thereof.

78. The apparatus of claim 77, in which the third transmission settings for the first known payload and the second known payload are the same as the first transmission settings for the first unknown payload and a second unknown payload from the second TRP, fourth data within the second unknown payload being unknown to the receiving device prior to transmitting the second unknown payload.

79. The apparatus of claim 77, in which the first known payload is different from the second known payload.

80. The apparatus of claim 77, in which the multiplexing scheme comprises space division multiplexing (SDM), time division multiplexing (TDM), or frequency division multiplexing (FDM).

81. The apparatus of claim 77, in which: the instructions further cause the apparatus to transmit information comprising a periodicity, time and frequency resources, and payload size of the first known payload and the second known payload; and the information is transmitted via radio resource control (RRC) signaling, a media access control layer (MAC) control element, or downlink control information (DCI).

82. The apparatus of claim 77, in which the first known payload and the second known payload are transmitted on a physical downlink control channel (PDCCH), each of the first known payload and the second known payload paired with a corresponding payload transmitted on a physical downlink shared channel (PDSCH).

83. The apparatus of claim 77, in which the instructions further cause the apparatus to transmit information comprising a periodicity, time and frequency resources, and payload size of the first known payload; and the information is received via radio resource control (RRC) signaling, a media access control layer (MAC) control element, or downlink control information (DCI).

84. The apparatus of claim 77, in which the first known payload and the second known payload are transmitted according to a periodic schedule, a semi-persistent schedule, or aperiodically.

85. The apparatus of claim 77, in which the instructions further cause the apparatus to scramble the first known payload and the second known payload based on a radio resource control (RRC) scrambling seed.

86. The apparatus of claim 85, in which the first known payload and the second known payload are known based on the RRC scrambling seed.

87. The apparatus of claim 74, in which the first request is received via a physical uplink control channel (PUCCH) or a media access control layer (MAC) control element (CE).

88. The apparatus of claim 87, in which the instructions further cause the apparatus to transmit the first known payload via a physical downlink shared channel (PDSCH).

89. The apparatus of claim 74, in which:
the first transmitting device is a first user equipment (UE);
the receiving device is a transmit and receive point (TRP) of a multi-TRP group;
transmitting the first known payload comprises transmitting the first known payload to each TRP of the multi-TRP group.

90. The apparatus of claim 89, in which:
the set of transmitting devices comprises a set of UEs;
the first request further comprises a second request for a second known payload from a second UE of the set of UEs, third data within the second known payload being known to the TRP and the second UE prior to receiving the second request for the second known payload; and
the second transmission settings comprise transmission settings for the second known payload.

91. The apparatus of claim 89, in which the second transmission settings for the first known payload are the same as the first transmission settings for the first unknown payload.

92. The apparatus of claim 89, in which the instructions further cause the apparatus to transmit the first known payload via a physical uplink control channel (PUCCH).

93. The apparatus of claim 92, in which the instructions further cause the apparatus to transmit a second known payload via a physical uplink shared channel (PUSCH), the first known payload paired with the second known payload, third data within the second known payload being known to both the TRP and the first UE prior to transmitting the second known payload.

94. The apparatus of claim 89, in which the first request is received via a physical downlink control channel (PDCCH) or a media access control layer (MAC) control element (CE).

95. A first transmitting device of a set of transmitting devices for wireless communication, comprising:
- means for transmitting, to a receiving device of a set of receiving devices, a first unknown payload based on first transmission settings of the first transmitting device, first data within the first unknown payload being unknown to the receiving device prior to transmitting the first unknown payload;
- means for receiving, from the receiving device, a first request for a first known payload for training an artificial neural network of the receiving device, the first request indicating second transmission settings for the first known payload, the second transmission settings comprising at least one of a rank, a beam pair, a modulation and coding scheme (MCS), or a combination thereof, second data within the first known payload being known to both the receiving device and the first transmitting device prior to receiving the first request; and
- means for transmitting, to the receiving device, the first known payload based on the first transmission settings.

96. The first transmitting device of claim 95, in which:
the receiving device is a user equipment (UE);
the first transmitting device is a serving transmit and receive point (TRP); and
the set of transmitting devices comprises a multi-TRP group.

97. The first transmitting device of claim 96, in which:
the set of receiving devices comprises a group of UEs; and
the means for transmitting the first known payload comprises means for transmitting the first known payload to each UE of the group of UEs.

98. The first transmitting device of claim 96, in which:
the first request further comprises a second request for a second known payload from a second TRP of the multi-TRP group and third transmission settings for the first known payload and the second known payload, third data within the second known payload being known to both the receiving device and the second TRP prior to receiving the second request; and
the third transmission settings indicate at least one of a multiplexing scheme, a rank of each TRP of the multi-TRP group, a precoding of each TRP of the multi-TRP group, a beam pair, a modulation and coding scheme (MCS), or a combination thereof.

99. The first transmitting device of claim 98, in which the third transmission settings for the first known payload and the second known payload are the same as the first transmission settings for the first unknown payload and a second unknown payload from the second TRP, fourth data within the second unknown payload being unknown to the receiving device prior to transmitting the second unknown payload.

100. The first transmitting device of claim 95, in which:
the first transmitting device is a first user equipment (UE);
the receiving device is a transmit and receive point (TRP) of a multi-TRP group; and
the means for transmitting the first known payload comprises means for transmitting the first known payload to each TRP of the multi-TRP group.

101. The first transmitting device of claim 100, in which:
the set of transmitting devices comprises a set of UEs;
the first request further comprises a second request for a second known payload from a second UE of the set of UEs, third data within the second known payload being known to the TRP and the second UE prior to receiving the second request for the second known payload; and
the second transmission settings comprise transmission settings for the second known payload.

102. The first transmitting device of claim 101, in which the second transmission settings for the first known payload are the same as the first transmission settings for the first unknown payload.

103. A non-transitory computer-readable medium having program code recorded thereon for wireless communication by a first transmitting device of a set of transmitting devices, the program code executed by a processor and comprising:
- program code to transmit, to a receiving device of a set of receiving devices, a first unknown payload based on first transmission settings of the first transmitting device, first data within the first unknown payload being unknown to the receiving device prior to transmitting the first unknown payload;
- program code to receive, from the receiving device, a request for a first known payload for training an artificial neural network of the receiving device, the request indicating second transmission settings for the first known payload, the second transmission settings comprising at least one of a rank, a beam pair, a modulation and coding scheme (MCS), or a combination thereof, second data within the first known payload being known to both the receiving device and the first transmitting device prior to receiving the request; and
- program code to transmit, to the receiving device, the first known payload based on the first transmission settings.

* * * * *